Nov. 28, 1961 C. H. PHELPS 3,010,769
BALANCING MACHINE BEARING
Filed Sept. 24, 1959 2 Sheets-Sheet 1
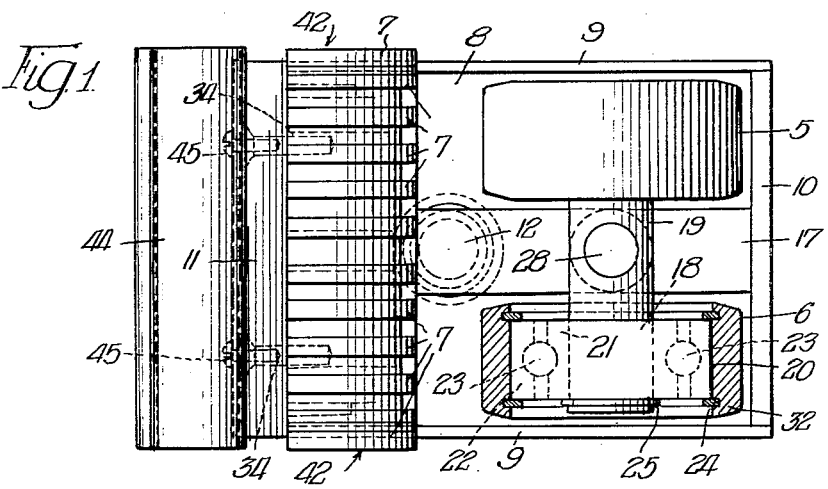
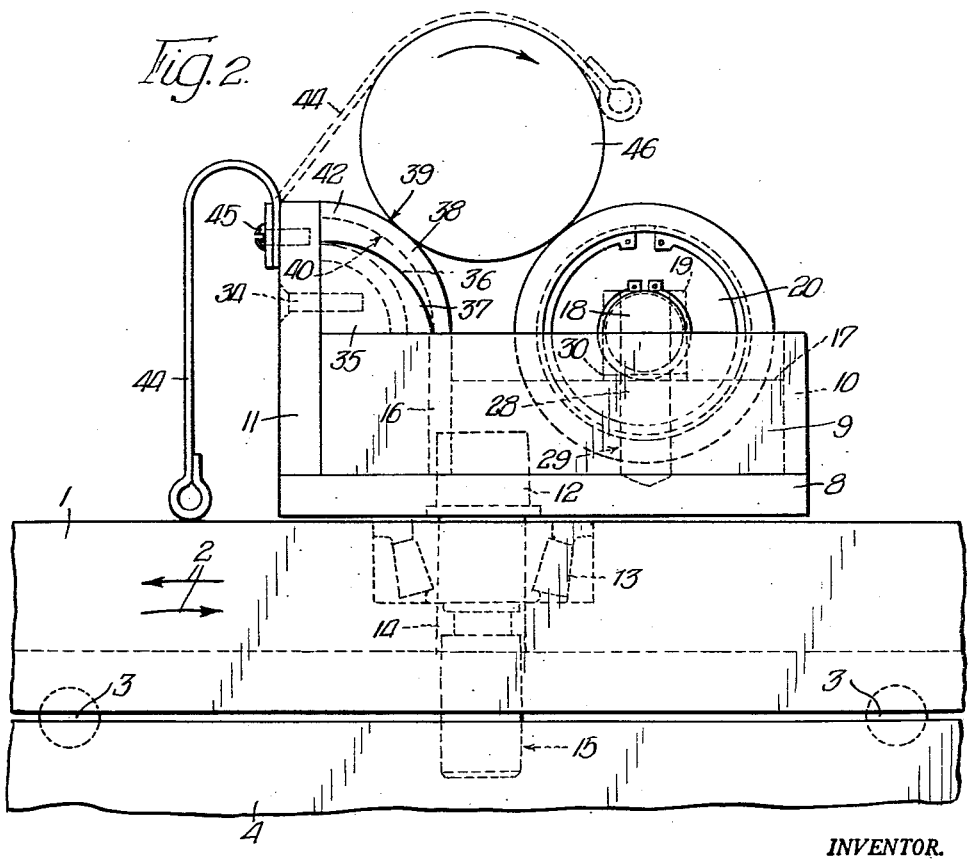
INVENTOR.
Clyde H. Phelps,
BY INVENTOR.
Clyde H. Phelps,
BY

United States Patent Office 3,010,769
Patented Nov. 28, 1961

3,010,769
BALANCING MACHINE BEARING
Clyde H. Phelps, Springfield, Ill., assignor to Raydyne Corporation, Springfield, Ill., a corporation of Illinois
Filed Sept. 24, 1959, Ser. No. 842,159
12 Claims. (Cl. 308—1)

This invention relates to a balancing machine bearing, and more particularly to an anti-friction, self-centering bearing for balance testing machines and the like.

So far there have been various bearing systems for supporting shafts, rolls, or other parts for rotation or turning movement, for example, on the upper movable heads of balance testing machines.

One form of bearing heretofore commonly employed has two pairs of rollers for accommodating and supporting the shaft, or other part, or the journal therefor. This form of bearing has the objection of causing the shaft or other part to crawl endwise through the bearing in case of misalignment of the anti-friction rollers.

Another form of bearing heretofore employed has been of V-shaped, or V-block form for accommodating the shaft, or other part, or the journal therefor, in the V of the bearing. This type of bearing has the objection of undue or excessive friction which, at least in some cases, is sufficient to prevent a belt trained about the shaft or other part from turning or rotating the same.

One of the broad concepts of the present invention resides in the provision of a low friction type of bearing that will accept a wide range of shaft diameters, and which will automatically center the shaft, or other part, over the vertical center of a bearing center pivoted mounting.

Another broad concept of the invention resides in the provision of means for preventing the shaft, or other part, from crawling through the bearing, due, for example, to misalignment of the anti-friction rollers, running against the shaft, or other part.

Another feature of the invention resides in the provision of a non-rotating end thrust surface and rear bearing shaft surface with the use of only two anti-friction rollers.

Another feature resides in the provision of non-rotating bearing means comprising an insert mounting and friction inserts arranged in spaced relation in such mounting and presenting spaced curved edges for coaction with the part which revolves in running contact with these edges and the rollers.

Another feature resides in the provision of rollers mounted in spaced relation on an axle and a pivot pin by which the axle is pivoted between the rollers for self-alignment with the non-rotating bearing means and non-crawling position control of the part which revolves in running contact with the non-rotating bearing means and the rollers.

Another feature resides in the provision of a supporting structure for the bearing and a pivot pin mounted to turn in a bearing in the movable top head of a balance testing machine and by which the supporting structure has turning movement about the axis of the pivot pin.

Another feature resides in the provision of an oil retaining wick adapted to be placed over the part which revolves in contact with the non-rotating bearing means and the rollers to provide surface lubrication for the part, the non-rotating bearing means and the rollers.

Further features and numerous advantages and adaptations of the invention will be apparent from the following detailed description taken in connection with the accompanying drawings, it being understood that the invention is limited only within the scope of the appended claims and not to the particular embodiment selected for illustration.

In the drawings:

FIGURE 1 is a top plan view of a bearing embodying the present invention;

FIGURE 2 is a front view of the bearing and showing portions of the movable top head and the static bottom head of a balance testing machine;

Figure 3:
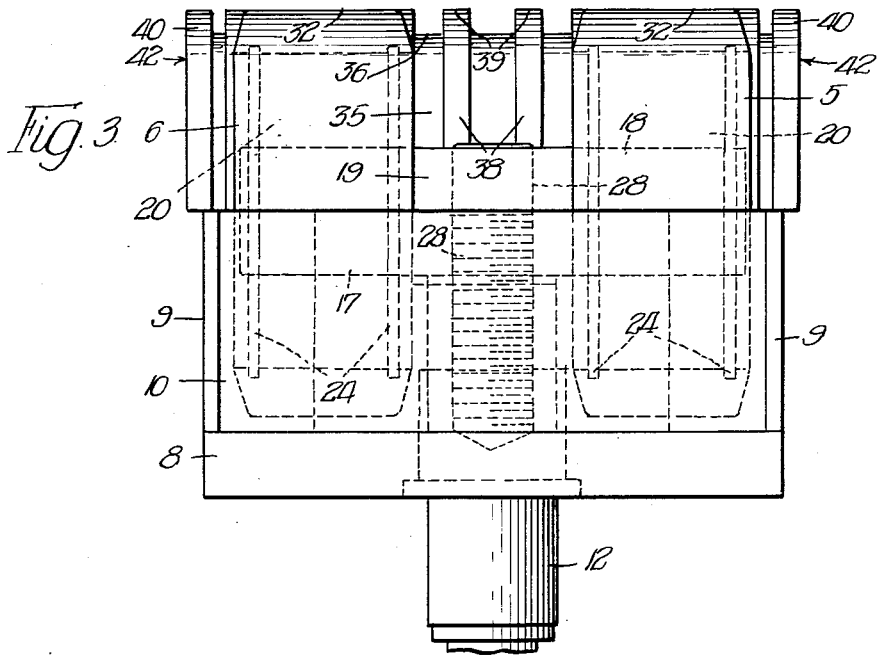
FIGURE 3 is an end view of the bearing.

Referring now to the drawings, the upper movable head of a balance testing machine is shown at 1. The head 1 moves, or oscillates, endwise in the directions of the arrows 2 (FIGURE 2) on balls 3 supported by the lower static head 4 of the balance testing machine.

The illustrated form of bearing according to the present invention includes a supporting or mounting structure for two anti-friction rollers 5 and 6, and back friction inserts 38.

The supporting or mounting structure has a bottom plate 8, a pair of spaced side plates 9, an end plate 10, and a backing plate 11. The side plates 9, end plate 10 and backing plate 11 are disposed in upright position. The backing plate 11 is of greater height than the plates 9 and 10, and extends above the plates 9 as shown in FIGURE 2.

The bottom plate 8 and thereby the bearing is mounted on the upper movable head 1 to turn about the axis of a center pivot pin 12. The pivot pin 12 turns, for example, in a Timken roller bearing 13 mounted in the top head 1. The pin 12 extends downwardly through an opening 14 in the top head 1 and into an opening 15 in the lower static head 4.

A cross rib 16 extends transversely between the side plates 9 and constitutes a support for the friction inserts 38. A center rib 17 extends between the cross rib 16 and the end plate 10, and constitutes a support for an axle 18. The intermediate portion of the axle 18 is of square form, as indicated in dotted lines at 19 in FIGURE 2, and the ends are turned down to cylindrical form and have the spaced anti-friction rollers 5 and 6 mounted to turn or revolve on ball bearings 20 thereon.

As shown, more or less schematically, in dotted lines in relation to the lower bearing 20 in FIGURE 1, the bearings 20 have inner and outer races 21 and 22 with one or more sets of balls 23 therebetween. One set of balls is shown, but this is merely illustrative. Retaining rings coacting with races 22 are shown at 24, and retaining rings coacting with the inner races 21 are shown at 25.

The axle 18 intermediate its ends turns, for example, about the axis of a pivot pin 28, the lower end of which is mounted in an opening 29 in the center rib 17. A thrust washer is provided at 30.

From the foregoing, it will be apparent that the rollers 5 and 6 rotate, one between the center rib 17 and one of the side plates 9, and the other between the center rib 17 and the other side plate 9. Also, the axle 18 carrying the rollers 5 and 6 on its opposite ends is free to turn about the axis of the pivot pin 28. As shown in connection with the lower roller 6 in FIGURE 1, the rollers 5 and 6 may have bronze rings 32 on the outsides of the ball bearings 20 so as not to coin or cut into fine finished shafts, rolls, journals, or the like. These bronze rings 32 may, of course, be omitted within the scope of the present invention.

Attached by screws 34 to the backing plate 10 is a generally quadrant-shaped insert mounting member 35. The ends of this member 35 may rest upon the adjacent portions of the upper edges of the side plates 9. The member 35 has an arcuate portion 36 of substantially 90° spaced laterally from the anti-friction rollers 5 and 6. The arcuate portion 36 of the member 35 has spaced arcuate grooves 37 opening peripherally from the surface of the member 35 to receive corresponding arcuate-shaped babbitt inserts 38. The babbitt inserts 38 may be replaced by merely lifting them out of the grooves 37.

When in place, the arcuate edges 39 of the inserts 38 project outwardly from the peripheral portions 40 of the member 35. The end inserts 38 preferably overlap the ends of the member 35 as indicated at 42, and thus provide non-rotating end thrust surfaces 42 in case there is, for example, a flange or collar on the shaft, roller, journal or other part placed in the bearing.

Figure 4:
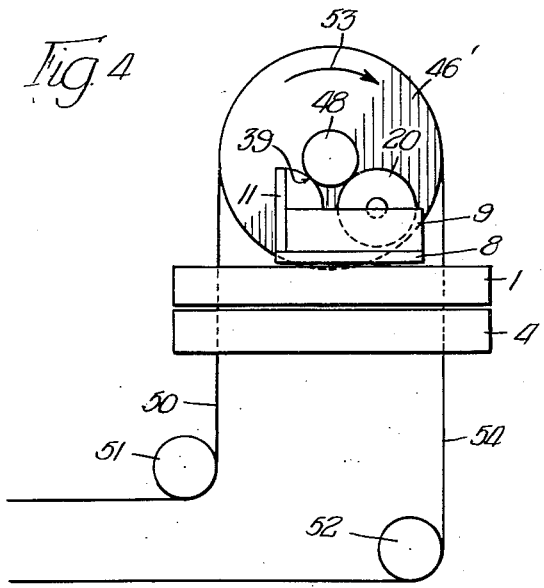
FIGURE 4 is a more or less schematic view showing a belt drive for that part which revolves in running contact with the non-rotating bearing means and the rollers.

An oil retaining wick 44 is attached to the backing plate 11 by screws 45 and is adapted to be placed over the shaft, roll or other part 46 as shown in dotted lines in FIGURE 2, or over a journal 48 for a part 46′ which is shown in FIGURE 4. Surface lubrication is thus provided for the shaft 46 or other part, and for the rollers 5 and 6 and the friction inserts 38.

In the use of the balancing machine bearing, according to the present invention, the shaft or other part 46 is placed on the opposing surfaces of the rollers 5 and 6 and the inserts 38 as shown in FIGURE 2, or the journal 48 for such shaft or other part is so placed as shown in FIGURE 4.

As shown more or less schematically and fragmentarily in FIGURE 4, the shaft or other part 46 or 46′ is rotated by an endless belt 50 trained about an idler pulley 51 and over the shaft or journal thereof, or other part, and about a pulley 52. As the direction of rotation is as indicated by the arrow 53 in FIGURE 4, and the belt drive 50 is arranged below the work piece 46′, most of the starting friction will be reduced at the roller side of the bearing, on the tight side 54 of the belt drive.

Because of the central pivotal mounting between the load carrying bearings 20 on the pivot pin 28, the outside ends of the axle 18 will deflect downwardly in proportion to the load carried upon the bearings 20. This, in effect, makes the pressure between the inside surfaces of the bearings 20 greater than the deflected outer surfaces, which provide a cone effect and prevents endwise crawl of the shaft or other part in the bearing.

In addition to preventing the shaft or other part from crawling through the bearing, the bearing according to the present invention is a low friction type bearing that will accept a wide range of shaft or work piece diameters, and automatically center the shaft or other part over the vertical center of the bearing center pivoted mounting.

Moreover, the bearing according to the present invention provides a non-rotating end thrust surface and rear bearing surface with the use of only two anti-friction rollers.

The bearing of the present invention avoids the difficulties encountered where misalignment occurs with two pairs of rollers, and it also avoids the difficulty of undue or excessive friction with V-shaped, or V-block forms of bearings.

The embodiment of the invention disclosed in the drawings and the specification is for illustrative purposes only, and it is to be expressly understood that said drawings and the specification are not to be construed as a definition of the limits or scope of the invention, reference being had to the appended claims for that purpose.

I claim:

1. In a bearing of the class described, in combination, non-rotating bearing means, a pair of anti-friction rollers spaced laterally from said non-rotating bearing means for receiving a part which revolves in running contact with said non-rotating bearing means and said rollers, an axle on which said rollers are mounted in axially spaced relation for turning movement about the axis of said axle, and a pivot pin pivoting said axle intermediate said rollers for lateral turning movement of said axle and rollers relative to said non-rotating bearing means about an axis transversely disposed relative to the axis of said axle for self-alignment and non-crawling position control of the part which revolves in running contact with said non-rotating bearing means and said rollers.

2. A bearing according to claim 1 wherein the non-rotating bearing means has a curved friction surface for coaction with the part which revolves in running contact therewith and with the rollers.

3. A bearing according to claim 1 wherein the non-rotating bearing means has an end thrust surface.

4. In a bearing of the class described, in combination, a supporting structure, a plurality of friction inserts presenting spaced curved edges, a pair of coaxial anti-friction rollers mounted on an axle and having longitudinally aligned peripheral surfaces spaced laterally from said curved edges to receive a part which involves in running contact with said curved edges and said peripheral surfaces of said rollers, and a pivot pin by which said axle is pivotally mounted between said rollers for lateral turning movement of said axle and said rollers relative to the curved edges of said inserts for self-alignment with said curved edges and non-crawling position control of the part which revolves in running contact with said curved edges and said rollers.

5. A bearing according to claim 4 wherein an end insert projects longitudinally and is positioned to present an end thrust surface.

6. A bearing according to claim 4 wherein there is a pivot pin mounted to turn in a bearing in the movable top head of a balance testing machine, said supporting structure having turning movement about the axis of said pivot pin.

7. A bearing according to claim 4 wherein the part which revolves in running contact with the curved edges and the rollers is rotated by a belt trained about said part.

8. A bearing according to claim 4 wherein there is an oil retaining wick attached to said supporting structure and adapted to be placed over the part which revolves in running contact with the curved edges and the rollers to provide surface lubrication for said part, said rollers, and said curved edges.

9. In a bearing of the class described, in combination, non-rotating bearing means, and a pair of anti-friction rollers spaced laterally from said non-rotating bearing means for receiving a part which revolves in running contact with said non-rotating bearing means and said rollers, said non-rotating bearing means comprising an insert mounting having spaced grooves and babbitt inserts positioned in said grooves and adapted to be lifted out of said grooves and replaced.

10. In a bearing of the class described, in combination, non-rotating bearing means, and a pair of anti-friction rollers spaced laterally from said non-rotating bearing means for receiving a part which revolves in running contact with said non-rotating bearing means and said rollers, said non-rotating bearing means comprising an insert mounting having spaced grooves and babbitt inserts positioned in said grooves and adapted to be lifted out of said grooves and replaced, said inserts presenting spaced curved edges for coaction with the part which revolves in running contact therewith and with the rollers.

11. In a bearing of the class described, in combination, non-rotating bearing means, and a pair of anti-friction rollers spaced laterally from said non-rotating bearing means for receiving a part which revolves in running contact with said non-rotating bearing means and said rollers, said non-rotating bearing means comprising an insert mounting having spaced grooves and babbitt inserts positioned in said grooves and adapted to be lifted out of said grooves and replaced, said inserts presenting spaced curved edges for coaction with the part which revolves in running contact therewith and with the rollers, the end inserts projecting from said insert mounting and presenting end thrust surfaces.

12. In a bearing of the class described, in combination, non-rotating bearing means, a pair of anti-friction rollers spaced laterally from said non-rotating bearing means for receiving a part which revolves in running contact with said non-rotating bearing means and said rollers, and an oil retaining wick adapted to be placed over the part which revolves in running contact with said non-rotating bearing means and said rollers to provide surface lubrication for said part, said non-rotating bearing means and said rollers.

References Cited in the file of this patent
UNITED STATES PATENTS

| | | |
|---|---|---|
| 656,017 | Fulton | Aug. 14, 1900 |
| 2,926,974 | Anderson et al. | Mar. 1, 1960 |

FOREIGN PATENTS

| | | |
|---|---|---|
| 406,985 | Germany | Dec. 8, 1924 |